Dec. 12, 1967  J. KURLOVICH  3,357,123
FISH LURE
Filed Jan. 18, 1965
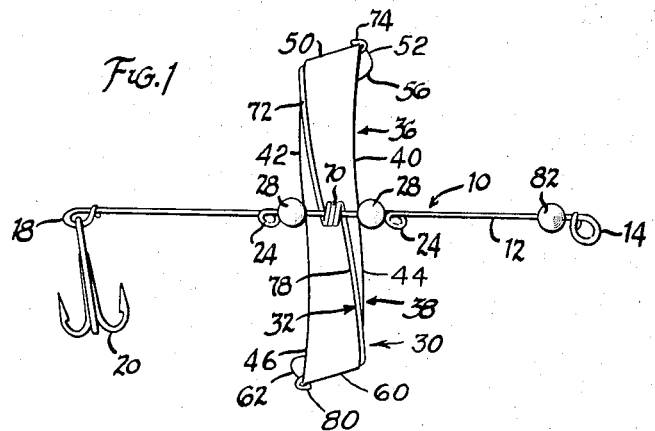
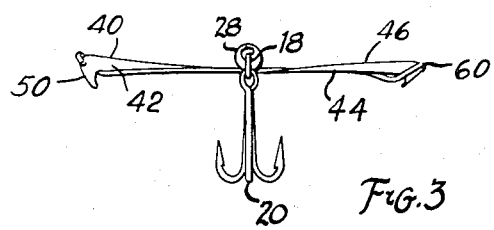
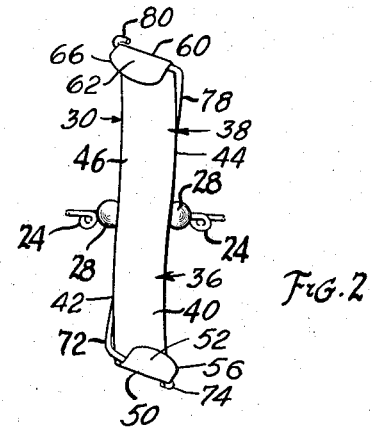
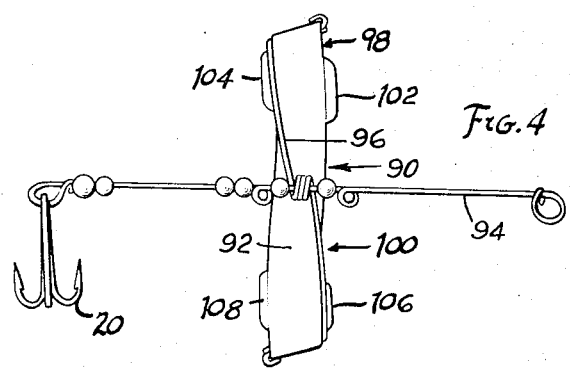
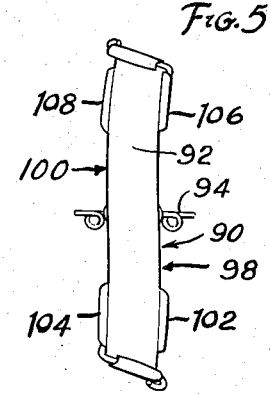
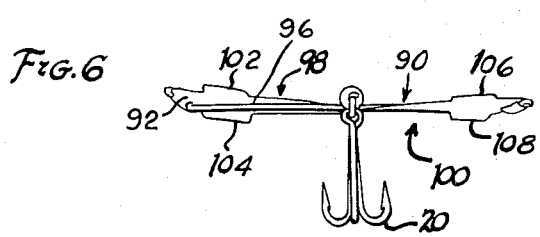
INVENTOR
JOHN KURLOVICH

United States Patent Office 3,357,123
Patented Dec. 12, 1967

3,357,123
FISH LURE
John Kurlovich, 32225 MacKenzie Ave.,
Garden City, Mich. 48135
Filed Jan. 18, 1965, Ser. No. 426,021
4 Claims. (Cl. 43—42.2)

ABSTRACT OF THE DISCLOSURE

A spinner which is carried by a longitudinal wire and having two blades with the blades being positioned with one blade on one side of the wire and the other blade on the opposite side of the wire and the blades are oppositely inclined and oppositely extending and connected to the longitudinal wire by a transverse wire in spinning relation and the disclosure also includes extensions on edges of the inclined blades which are formed at an angle thereto.

---

This invention relates to fish lures and more particularly to singing sonic spinner type of such lures.

It is an object of the present invention to provide an inexpensive and effective fishing lure of the spinning type which due to its novel construction creates a singing to simulate a large insect.

Other objects of this invention will appear in the following description and appended claims, reference being had to the accompanying drawings forming a part of this specification wherein like reference characters designate corresponding parts in the several views.

In the drawings:

FIGURE 1 is a plan view in elevation of a fishing lure embodying features of my invention;

FIGURE 2 is a plan view in elevation of a portion of the reverse side of the lure shown in FIGURE 1;

FIGURE 3 is an end view in elevation of a portion of the lure shown in FIGURE 1;

FIGURE 4 is a plan view in elevation of a modified form of fishing lure embodying features of my invention;

FIGURE 5 is a plan view in elevation of a portion of the reverse side of the lure shown in FIGURE 4, and FIGURE 6 is an end view in elevation of a portion of the lure shown in FIGURE 4.

Before explaining the present invention in detail, it is to be undertood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings the numeral 10 designates in general a fishing lure. This lure 10 comprises a wire 12 having at its forward end a closed loop or eye 14 adapted to secure the fishing line adjacent the head end of the lure. The opposite or trailing end of the wire 12 is formed into a releasable loop 18 which is adapted to receive and secure the eye of a triple hook 20.

The wire 12 is coiled to provide two spaced apart loops 24 to act as stops for two spaced apart plastic bearing members 28 which are carried on wire 12 between loops 24.

A spinner 30 is secured to the wire 12 between the bearing members 28 by a transverse wire 32. The spinner 30 has two blades or vanes 36 and 38 which are oppositely inclined and oppositely extending. The blade 36 is inclined, as shown in FIGURE 2, so that its leading edge 40 is lower than its trailing edge 42. The blade 38 is inclined with its leading edge 44 higher than its trailing edge 46.

The end 50 of the blade 36 is at a substantially right angle to the other portion of the blade and is inclined inwardly toward the central portion of the spinner and toward the edge 40 of the blade 36 as will be noted at 52. By forming the end 50 in this manner, a portion 56 extends beyond edge 40 of the blade 36. The end 60 of blade 38 is at a substantially right angle to the other portion of the blade and is inclined inwardly toward the central portion of the spinner and toward the edge 46 of blade 38 as will be noted at 62. By forming the end 60 in this manner, a portion 66 extends beyond edge 46 of blade 38.

The wire 32 is coiled around wire 12 as at 70 which is between bearing members 28. The wire 32 has a portion 72 which extends from the coiled portion 70 along one surface of blade 36 to adjacent the end thereof and is then looped around the other side of the end of the blade adjacent the end 50 and continues with a small looped portion 74 which extends back on the surface of the coiled portion 70. The wire 32 has portion 78 which extends from the coiled portion 70 along one surface of the blade 38 to adjacent the end thereof and is then looped around the other side of the end of the blade adjacent the end 60 and continues with a small looped portion 80 which extends back on the surface of the coiled portion 70. Thus the transverse wire 32 secures the spinner 30 to wire 12 by coiled portion 70 so that the spinner is free to spin upon movement in the water. If desired one or more plastic balls 82 of bright colors may be placed on wire 12 to attract fish to the lure 10.

The lure 90 shown in FIGURES 4, 5 and 6 is the same as the lure 10 of FIGURE 1 except the spinner 92 is of different design. The lure 90 includes wire 94 and transverse wire 96 which correspond to wires 12 and 32 of FIGURE 1 and serve the same purpose. In this instance the spinner 90 has oppositely inclined blades 98 and 100 which are also oppositely positioned. On this spinner are four extensions (see FIGURE 5) 102, 104, 106 and 108. The extensions 102 and 104 are positioned adjacent the end of blade 98 with the extension 102 being inclined downwardly from the other surface of the blade and the other extension 104 being inclined upwardly from the other surface of the blade 98. The extensions 106 and 108 are positioned adjacent the end of blade 100 with the extension 106 being inclined upwardly from the other surface of the blade and the other extension 108 being inclined downwardly from the other surface of the blade 100.

Because of the novel construction of the spinners 30 and 90 a singing effect is produced to simulate a large insect.

Although only preferred forms of the invention have been illustrated, and those forms described in detail, it will be apparent to those skilled in the art that various modifications may be made without departing from the spirit of the invention or from the scope of the appended claims.

Having thus described my invention, I claim:

1. A fishing lure comprising a longitudinal member, a trolling spinner formed of a single sheet of material and comprising two substantially oppositely extending blades arranged on different angles, one of said blades being inclined with its leading edge being lower than its trailing edge and the end thereof being inclined inwardly toward one of said edges of the spinner and the other of said blades being inclined with its leading edge being higher than its trailing edge and the end thereof being inclined inwardly toward the opposite edge of the spinner and means positioned transverse to and pivotally connected to said longitudinal member and having a portion connected to each end of the spinner.

2. A fishing lure comprising a longitudinal wire, a trolling spinner comprising two substantially oppositely extending and oppositely inclined blades, one of said blades being inclined with its leading edge being lower than its trailing edge and the end thereof being at right angles to the central portion of the spinner and inclined in a direction toward the higher edge of the spinner and the other of said blades being inclined with its leading edge being higher than its trailing edge and the end thereof being at right angles to the central portion of the spinner and inclined in a direction toward the higher edge of the spinner and a wire positioned transverse to and loosely looped around said longitudinal wire and each end of said spinner.

3. A fishing lure comprising a longitudinal wire, a trolling spinner comprising two substantially oppositely extending and oppositely inclined main blades, one of said blades being inclined with its leading edge being lower than its trailing edge and having extensions on each edge adjacent the end thereof with the extension on the leading edge being inclined downwardly below the other portion of the leading edge and the extension on the trailing edge being inclined upwardly above the other portion of the trailing edge and the other of said blades being inclined with its leading edge being higher than its trailing edge and having extensions on each edge adjacent the end thereof with the extension on the leading edge being inclined upwardly above the other portion of its leading edge and the extension on the trailing edge being inclined downwardly below the other portion of the trailing edge and transverse means extending across said main blades and pivotally connecting said spinner to said longitudinal wire.

4. A fishing lure comprising a wire member having a looped eye at its forward end and a loop at its tail end to removably secure a fishing hook, said wire also having a pair of spaced apart loops intermediate its ends, spaced apart bearing members on said wire between said spaced apart loops, a spinner, and a transverse wire having a portion coiled around the first named wire between said spaced apart bearing members, said transverse wire having portions extending along one surface of said spinner with the ends of said portions being looped around the ends of the opposite side of the spinner to lock the spinner to the first named wire.

References Cited

UNITED STATES PATENTS

| | | | |
|---|---|---|---|
| 671,613 | 4/1901 | Shakespeare et al. | 43—42.14 |
| 810,017 | 1/1906 | Ackerman | 43—42.14 X |
| 2,586,141 | 2/1952 | Angell | 43—42.14 |
| 2,626,478 | 1/1953 | Folmer | 43—42.19 |

SAMUEL KOREN, *Primary Examiner.*

WARNER H. CAMP, *Examiner.*